UNITED STATES PATENT OFFICE 2,676,104

CHOLINE CHLORIDE COMPOSITION

Edward S. Blake, Lexington, and Louis F. Loutrel, Jr., Wellesley, Mass., assignors to Monsanto Chemical Company, St. Louis, Mo., a corporation of Delaware No Drawing. Application December 29, 1950, Serial No. 203,550

9 Claims. (Cl. 99—2)

The present invention relates to choline chloride compositions, and particularly to the preparation of choline chloride compositions which are substantially non-corrosive and highly resistant to discoloration in the presence of ferrous metals or alloys, and are suitable for use in animal and poultry feeds.

It has been proposed heretofore to use choline chloride in animal and poultry feeds as a growth stimulant and perosis preventative. Such choline chloride has been prepared and sold in the form of an aqueous solution containing about 70% by weight of choline chloride which is equivalent to about 60% by weight of free choline. The aqueous solutions of choline chloride are fairly corrosive and become highly discolored, turning dark brown, in the presence of ferrous metals or alloys as, for example, iron or steel. This discoloration and the corrosive nature of aqueous choline chloride solutions is objectionable to the trade. To avoid this discoloration and corrosive action, it has generally been necessary to prepare, store and handle the aqueous solutions of choline chloride in non-ferrous containers, for example, rubber, glass or plastic lined equipment. This procedure is objectionable from the standpoint of cost and inconvenience.

In accordance with the present invention, it is possible to inhibit the discoloration of aqueous solutions of choline chloride so that the solutions will not discolor to any appreciable extent when they are in contact with ferrous metal surfaces. It is also possible to accomplish this result in accordance with this invention without impairing the usefulness of the choline chloride solutions in animal or poultry nutrition.

It is accordingly one object of this invention to inhibit the discoloration and corrosive properties of aqueous solutions of choline chloride in contact with ferrous metal surfaces.

It is a further object of this invention to provide aqueous solutions of choline chloride which have excellent resistance to discoloration and which are substantially non-corrosive in the presence of ferrous metal surfaces without impairing the nutritive and perosis preventative valve of such solutions when they are used in animal or poultry feeds.

It is a further object of this invention to provide animal or poultry feeds containing choline chloride which has excellent resistance to discoloration and is substantially non-corrosive in the presence of ferrous metal surfaces.

Still further objects and advantages of this invention will appear in the following description and the appended claims.

It has presently been found that when choline phosphate is incorporated in aqueous solutions of choline chloride the resulting solution can be stored for long periods of time in contact with ferrous metal surfaces such as iron or steel without discoloration of the solution or corrosion of the ferrous metal surfaces. Moreover, the resulting solution may be incorporated in animal or poultry feed compositions without affecting the nutritive and growth stimulating properties of the choline chloride.

The quantity of choline phosphate used may be varied considerably. The minimum amount employed should be sufficient to inhibit discoloration of the choline chloride solution. Generally, satisfactory results are obtained by providing an aqueous solution which contains at least 1 molecular proportion of choline phosphate, calculated as the mono-phosphate, for 99 molecular proportions of choline chloride. Best results have been obtained by using from 3.5 to 10 molecular proportions of choline phosphate for 97.5 to 90 molecular proportions of choline chloride. The use of large amounts of choline phosphate should be avoided especially at solution concentrations of 60 to 70% by weight of choline salt solids since aqueous solutions of choline phosphate have a high viscosity at such concentrations and the solutions have poor flow characteristics. In such instances the maximum amount of choline phosphate used should preferably not exceed about 40 molecular proportions of choline phosphate for 60 molecular proportions of choline chloride in a solution containing about 60 to 75% by weight of choline salt solids.

The choline phosphate may be incorporated in the aqueous choline chloride solutions in a variety of ways. Thus, it is possible to form separate aqueous solutions of choline chloride and choline phosphate and then mix the resulting solutions. This procedure is not as desirable as the procedure which is described in greater detail hereinafter since it is usually necessary with the above described procedure to employ an excessive amount of equipment and, in order to minimize discoloration of the choline chloride, it is also usually necessary to prepare the choline chloride solution in a container having a non-ferrous inner surface. The use of a non-ferrous surface is not essential, however, if the choline phosphate solution is incorporated in the choline chloride solution within a short period of time after the preparation of the choline chloride solution.

The preferred procedure for preparing the compositions of this invention comprises treating a water solution of choline with phosphoric acid and hydrochloric acid to form a mixture of choline chloride and choline phosphate in situ. The hydrochloric acid and phosphoric acid may be added separately in any order or the acids may be premixed and added to aqueous choline solution in the form of a mixed acid. To illustrate the above procedures, the aqueous solution of choline is treated with an amount of phosphoric acid and hydrochloric acid sufficient to provide from about 1 to 40 molecular proportions of phosphoric acid and from 99 to 60 molecular proportions of hydrochloric acid for each 100 molecular proportions of choline in the choline solution. For satisfactory results from the standpoint of low color solutions, it is preferred to add the phosphoric and hydrochloric acid separately until the pH of the resulting solution is between about 6 and 8 at about 15° C. while maintaining the solution at a temperature of 20° C. or lower.

For best results, it is preferred to add the required amount, as specified above, of phosphoric acid first, after which the hydrochloric acid is added until the pH of the solution is between about 5 and 6.8. The solution is then preferably adjusted to a pH between about 7.0 and 8.0 by the addition of sodium bicarbonate or sodium carbonate.

The above solutions may be concentrated to the desired commercial strength by vacuum concentration. Commercial solutions containing from about 60 to 75% by weight of choline salt solids are readily prepared in accordance with the foregoing procedures. These solutions do not discolor to any appreciable extent in contact with ferrous metals or alloys and do not appreciably corrode such metals or alloys even after long periods of storage. They have good flow characteristics and are readily incorporated in animal or poultry feeds, or on edible carriers such as hominy grit, wheat and the like. These solutions have substantially the same growth stimulation and perosis preventative characteristics as those consisting of choline chloride per se, and have about the same toxicity as solutions of choline chloride per se. Moreover, the compositions of this invention have the added advantage of providing a source of phosphorous in the animal or poultry diet.

A further understanding of the processes and products of this invention will be obtained from the following specific examples which are intended to illustrate the invention but not to limit the scope thereof, parts and percentages being by weight unless otherwise specified.

*Example I*

Two hundred an fifty-five parts of an aqueous solution consisting of about 93 parts of choline and 162 parts of water were charged to a stainless steel kettle immediately after the choline was prepared. A mixture of 6.2 parts of 75% phosphoric acid and 88 parts of 22° Bé. hydrochloric acid were added to the choline solution until the pH of the mixture was between 6.0 and 6.5. The temperature was maintained at about 15° C. during neutralization. Practically all of the acid solution was consumed in reaching this pH value. The solution color was 40 A. P. H. A. (Cobalt-Platinum Hazen Color Standards).

The above solution was concentrated under vacuum within the range of 25 to 29 inches of mercury (absolute pressure) at a temperature of about 82° C. until it contained about 70% choline salt solids, after which it was filtered. The product did not discolor on standing in contact with iron or steel or ferrous alloys for periods up to 3 months. Moreover, the ferrous metal surfaces were not corroded by the solution. The solutions poured easily even at low temperatures and had a very low color, less than 60 A. P. H. A. (Cobalt-Platinum Hazen Color Standards).

*Example II*

Two hundred an fifty-five parts of an aqueous solution consisting of about 93 parts of choline and 162 parts of water were charged to a steel kettle immediately after the choline was prepared. Six and two-tenths parts of 75% phosphoric acid solution were diluted with water until the solution contained 25% phosphoric acid and the whole was then added to the choline solution with stirring. Eighty-eight parts of 22° Bé. hydrochloric acid were then added to the solution until the pH of the solution was between 5.0 and 5.6. This required the addition of substantially all of the hydrochloric acid solution. The solution was maintained at about 15° C. during neutralization. The solution color was 30 A. P. H. A. (Cobalt-Platinum Hazen Color Standards).

The above solution was concentrated under a vacuum of less than 100 millimeters of mercury (absolute pressure) at a temperature between 40 and 65° C. until it contained about 70% choline salt solids, after which it was filtered in the presence of a filter aid. The resulting solution was very clear and had a color of less than 40 A. P. H. A. (Cobalt-Platinum Hazen Color Standards). The solution was adjusted to a pH between 7.0 and 7.6 with sodium bicarbonate. This solution did not discolor on standing in contact with iron or ferrous alloys for periods up to 3 months. Moreover, the ferrous metal surfaces were not corroded by the solution. The viscosity of the solution was 28 as determined by a Brookfield viscometer at 25° C.

*Example III*

The solutions of the mixtures of choline chloride and choline phosphate, prepared as described in Example II, were added to a basal poultry diet and fed to chicks for the purpose of comparing the perosis preventative value of the mixture with choline chloride per se and a control diet free of choline salts according to the following procedure and with the following results:

The chicks at hatching were placed in an electrically heated metal battery brooder equipped with raised wire screen floors. They were started on the diets described below at one day of age and the test was conducted over a period of 4 weeks. The chicks used in the test were Hall Cross sex-linked cockerel chicks.

Thirty chicks were fed with the following basal diet (chlorine free) as a negative control group:

| | |
|---|---|
| Water washed casein | 24.0%. |
| Cystine | 0.4%. |
| Glycine | 0.9%. |
| Calcium gluconate | 5.0%. |
| Oil mixture[1] | 2.0%. |
| Cellu flour | 5.0%. |
| Salt mixture[2] | 0.5%. |
| Dicalcium phosphate | 2.62%. |
| Dibasic potassium phosphate | 1.30%. |
| Calcium carbonate | 1.85%. |
| Potassium chloride | 0.30%. |
| Magnesium sulfate | 0.40%. |
| Sodium silicate | 0.20%. |
| Cholic acid | 0.10%. |
| Vitamin mixture[3] | 0.05%. |
| Potassium iodide | 50 milligrams per kilogram of ration. |
| Biotin | 150 micromilligrams per kilogram of ration. |
| Niacin | 55 milligrams per kilogram of ration. |
| Glucose (cerelose) (to make 100%) | 55.+. |

[1] The oil mixture contained the following ingredients:

| | Grams |
|---|---|
| Fish oil | 500 |
| Crude soybean oil (containing 10 milligrams of alpha-tocophenol per gram) | 100 |
| Corn oil | 400 |

[2] The salt mixture contained the following ingredients:

| | Grams |
|---|---|
| $MnSO_4.4H_2O$ | 200 |
| $FeSO_4.7H_2O$ | 50 |
| $CuSO_2.4H_2O$ | 20 |
| $Al_2(SO_4).18H_2O$ | 60 |
| Cobalt acetate.$4H_2O$ | 0.9 |
| $ZnSO_4.7H_2O$ | 22 |
| NaCl—to make 1 kilogram of mixture. | |

[3] The vitamin mixture contained the following ingredients:

| | | |
|---|---|---|
| Thiamin hydrochloride | milligrams | 1.0 |
| Riboflavin | do | 1.0 |
| Pyridoxine | do | 1.0 |
| d-Calcium pantothenate | do | 2.0 |
| Menadione | do | 2.0 |
| Pteroylglutamic acid | do | 0.2 |
| Glucose | gram | .05 |

These salts were dried in an oven after weighing and the whole was diluted with 4.5 parts of sodium chloride.

A second group of thirty chicks were fed the above basal diet to which had been added sufficient choline chloride to provide 0.1% choline, calculated as free base, based on the total diet as a positive control.

A third group of thirty chicks were fed the basal diet to which had been added an amount of the choline chloride-choline phosphate mixture of Example II sufficient to provide 0.1% choline, calculated as free base, based on the total diet.

The following table shows the number of cases of perosis which developed in each group of chicks at the end of the 4-week testing period.

| Feed Used | Number of Chicks Having No Perosis | Number of Cases of Perosis | | Twisted Leg |
|---|---|---|---|---|
| | | Slight Swelling | Severe Swelling | |
| Basal diet | 19 | 3 | 4 | 4 |
| Basal diet + choline chloride | 25 | 2 | 0 | 1 |
| Basal diet + product of Example II | 25 | 1 | 2 | 0 |

The results given in the above table indicate that the mixture of choline chloride is as effective as the choline chloride in the prevention of perosis in chicks.

Example III shows the use of an amount of the choline chloride and choline phosphate mixture sufficient to provide 0.1% choline, calculated as free base, based on the total ration. It is to be understood that the amount of the mixture of choline chloride and choline phosphate employed may be varied to some extent depending upon the particular ingredients in the feed and the nature of the animal or poultry which is fed with the ration. Thus, with chicks it is possible to use sufficient amounts of the mixture to provide from about 0.05 to 0.3% of choline, calculated as the free base, on the total ration. The upper limit may be increased to some extent in the case of animals up to about 0.4%.

Various modifications and changes may be made in the processes and compositions described herein as will be apparent to those skilled in the art to which they appertain without departing from the spirit and intent of the present invention. It is to be understood, therefore, that the present invention is not intended to be limited except by the scope of the appended claims.

What is claimed is:

1. A composition for use in animal and poultry feeds comprising an aqueous solution of choline chloride and an amount of choline phosphate sufficient to inhibit the discoloration of the composition in contact with ferrous metals.

2. A composition for use in animal and poultry feeds comprising an aqueous solution of choline chloride and choline phosphate, said choline salts being present in a ratio of 99 to 60 mols of choline chloride to 1 to 40 mols of choline phosphate, calculated as the monophosphate.

3. A composition for use in animal and poultry feeds comprising an aqueous solution of choline chloride and choline phosphate and having a pH between about 6 and 8, said choline salts being present in a ratio of 99 to 60 mols of choline chloride to 1 to 40 mols of choline phosphate calculated as the monophosphate.

4. A composition for use in animal and poultry feeds comprising an aqueous solution of choline chloride and choline phosphate containing about 60 to 75% by weight of said choline salts and having a pH between about 7 and 8, said choline salts being present in a mol ratio of 99 to 60 mols of choline chloride to 1 to 40 mols of choline phosphate, calculated as the monophosphate.

5. A composition for use in animal and poultry feeds comprising an aqueous solution of choline chloride and choline phosphate containing about 60 to 75% by weight of said choline salts and having a pH between about 7 and 8, said choline salts being present in a mol ratio of 97.5 to 90 mols of choline chloride to 3.5 to 10 mols of choline phosphate, calculated as the monophosphate.

6. A process of inhibiting the discoloration of aqueous solutions of choline chloride which comprises treating an aqueous solution of choline with phosphoric acid and hydrochloric acid in an amount sufficient to provide a solution having a pH between about 5.0 and 6.8, the phosphoric acid and hydrochloric acid being supplied in an amount sufficient to provide from about 1 to 40 mols of phosphoric acid and from about 99 to 60 mols of hydrochloric acid for each 100 mols of choline in the solution, and adjusting the pH of the solution between about 7 and 8 with a compound selected from the group consisting of sodium bicarbonate and sodium carbonate.

7. A feed composition comprising a feed selected from the group consisting of animal feeds and poultry feeds and a mixture of choline chloride and choline phosphate, said choline salts being present in a ratio of about 99 to 60 mols of choline chloride to 1 to 40 mols of choline phosphate, calculated as choline monophosphate, said mixture being present in amounts sufficient to provide from about 0.05 to 0.4% by weight of choline, calculated as the free base, based on the composition.

8. A poultry feed composition comprising a mixture of choline chloride and choline phosphate, said choline salts being present in a ratio of 99 to 60 mols of choline chloride to 1 to 40 mols of choline phosphate, calculated as choline monophosphate, said mixture being present in amounts sufficient to provide from about 0.05 to 0.3% by weight of choline, calculated as the free base, based on the composition.

9. A poultry feed composition comprising a mixture of choline chloride and choline phosphate, said choline salts being present in a ratio of 97.5 to 90 mols of choline chloride to 3.5 to 10 mols of choline phosphate, calculated as choline monophosphate, said mixture being present in amounts sufficient to provide from about 0.05 to 0.3% by weight of choline, calculated as the free base, based on the composition.

References Cited in the file of this patent

UNITED STATES PATENTS

| Number | Name | Date |
| --- | --- | --- |
| 2,550,558 | Hansen | Apr. 24, 1951 |
| 2,576,644 | Schmitz | Nov. 27, 1951 |

OTHER REFERENCES

Jackson: "J. Am. Chem. Soc.," vol. 57 (1935), pp. 1903–05.

Chemical Abstracts, vol. 31 (1937), p. 7845.

Riley: "J. Am. Chem. Soc.," vol. 66 (1944), pp. 512–13.